United States Patent [19]
Von Semel et al.

[11] 3,894,143
[45] July 8, 1975

[54] PROCESS FOR THE MANUFACTURE OF CRYSTALLIZED AMMONIA PHOSPHATES

[75] Inventors: Georg Von Semel, Dortmund; Eduard Schibilla, Dortmund-Solde, both of Germany

[73] Assignee: Friedrich Uhde GmbH, Dortmund, Germany

[22] Filed: Jan. 2, 1973

[21] Appl. No.: 320,525

[30] Foreign Application Priority Data
Feb. 2, 1972 Germany............................ 2204779

[52] U.S. Cl................................. 423/313; 423/321
[51] Int. Cl.$^2$................... C01B 15/16; C01B 25/26
[58] Field of Search............................ 423/304–313, 423/321

[56] References Cited
UNITED STATES PATENTS
1,981,145  11/1934  Keller ................................ 423/321
2,202,526  5/1940  Hixson et al........................ 423/321

FOREIGN PATENTS OR APPLICATIONS
834,049  2/1970  Canada

*Primary Examiner*—Oscar R. Vertiz
*Assistant Examiner*—Gregory A. Heller
*Attorney, Agent, or Firm*—Malcolm W. Fraser, Esq.

[57] ABSTRACT

A method of obtaining crystallized ammonium phosphate of good quality using ammonia and technical grade phosphoric acid that was liberated from the major portion of impurities after precipitation with an organic solvent. The purified mixture of aqueous phosphoric acid and organic solvents is contacted with ammonia for ammonization, retaining the ammonium phosphate crystals and separating the residual mixture of water and organic solvent by conventional methods. Preferably organic solvents are used that are well miscible with phosphoric acid and water and in which ammonium phosphates are insoluble.

1 Claim, 1 Drawing Figure

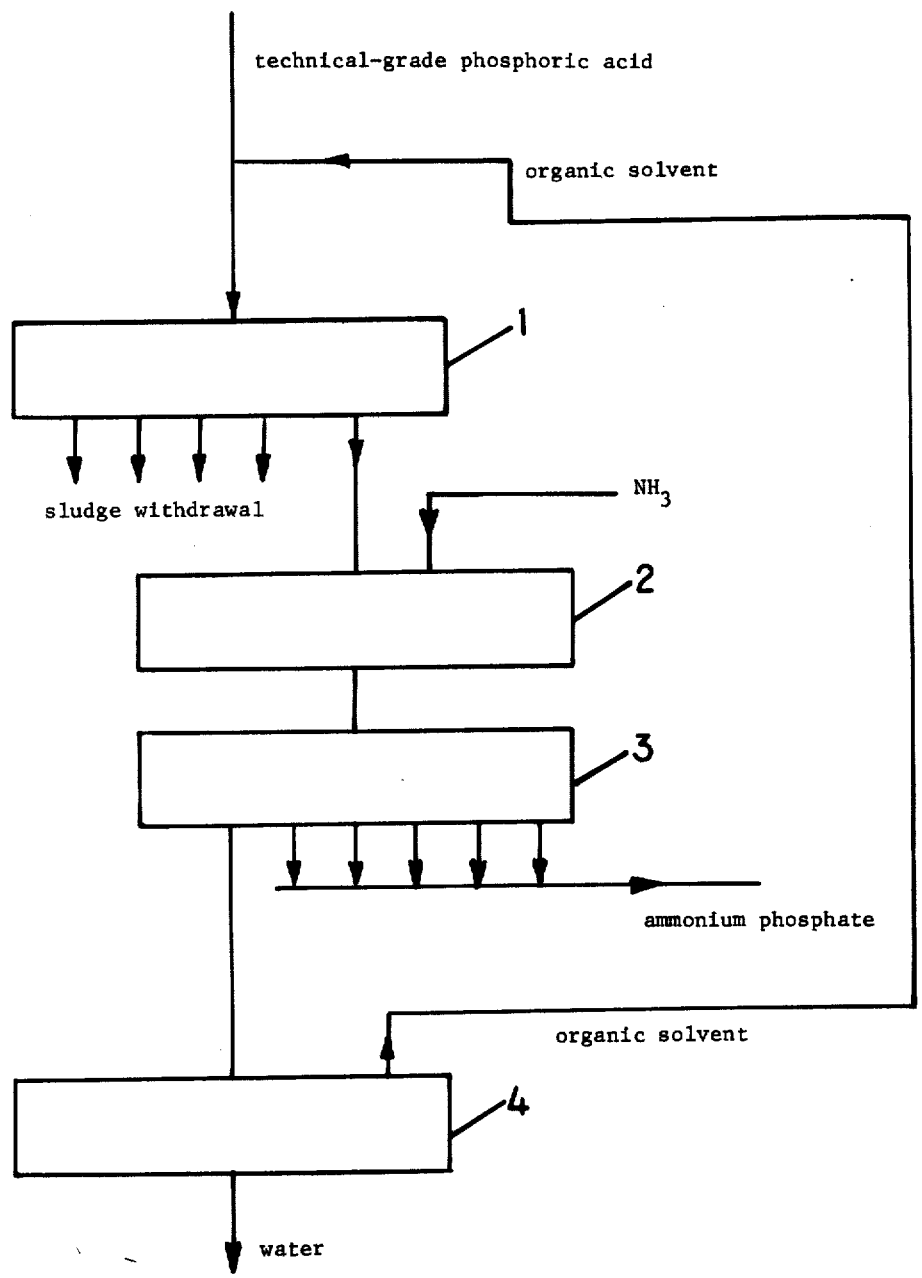

PROCESS FOR THE MANUFACTURE OF CRYSTALLIZED AMMONIA PHOSPHATES

BACKGROUND OF THE INVENTION

The present invention relates to a process for the manufacture of crystallized ammonium phosphates on an industrial scale from phosphoric acid and ammonia.

The manufacture of ammonium phosphates from technical grade phosphoric acid and ammonia is aimed at obtaining a substantially pure product at lowest energy and equipment requirements.

Ammonium phosphate, a mixture of mono- and di-ammonium phosphate, is obtained by ammonization of technical grade phosphoric acid with gaseous ammonia. The solution produced contains mono- and di-ammonium phosphate when the molar ratio of ammonia to phosphoric acid is in the range of 1:1 to 2:1. Its composition depends on the quantity of ammonia added. Owing to the water contained in technical grade phosphoric acid, i.e. a portion of 40 – 50 %, and the impurities consisting of $SO_4''$, $Fe^{..}$, $Fe^{...}$, $F'$, $SiF_6''$, $K^.$, $Ca^{..}$ and silicates which, individually or jointly, are a barrier to crystallization, no formation of crystals takes place in the solution. The solution must be evaporated to initiate crystallization. As a result of the presence of impurities, a part of the crystals is of moderate size only and, therefore, equipment requirements are high for separating the crystals by filtration. Pure water is expelled by evaporation while the impurities remain in the ammonium phosphate product.

To eliminate the drawbacks described, it has been proposed to purify the technical grade phosphoric acid before further processing, i.e., in this case before ammonization. It is known, for example, from German OS 2,101,759 to add certain definite organic solvents, such as alcohols, ketones and/or ether. These chemicals cause the precipitation of part of the impurities, which can then be separated. The purified mixture of phosphoric acid and organic solvent is subjected to distallation for expelling the solvent. The purified phosphoric acid is available at ordinary concentration for further processing, including ammonization. After ammonization, the solution must be subjected to the usual evaporation to reduce the water content, raise the concentration of the solution and initiate crystal formation. The concentrated and crystallized product contains the quantity of impurities that remained in the purified phosphoric acid. The process route from technical grade phosphoric acid to finished ammonium phosphate requires two heating phases, viz. distillation for expelling the organic solvent and evaporation to eliminate the water introduced by the phosphoric acid. Considerable heat is needed for vaporizing the water.

SUMMARY OF THE INVENTION

The object of the invention is to provide a method for obtaining crystallized ammonium phosphate of good quality, using technical grade phosphoric acid that was liberated from the major portion of impurities after precipitation, and ammonia, while reducing equipment and energy requirements to a minimum.

It was found that the problem can be solved by contacting the purified mixture of aqueous phosphoric acid and organic solvent with ammonia for ammonization, retaining the ammonium phosphate crystals and separating the residual mixture of water and organic solvent by conventional methods. It is advisable to use organic solvents that are well miscible with phosphoric acid and water and in which ammonium phosphates are insoluble. Referring to the subject process, the use of ketones, particularly acetone and methylethylketone, has proved its merits. The organic solvents, namely, acetone and methylethylketone respectively are miscible with water to an extent of 19 percent and infinite amount.

It is another object of the invention to separate the water from the organic solvent, which is then admixed again with the technical grade phosphoric acid and thus recycled.

The invention offers the particular advantages that the aqueous phosphoric acid need not be concentrated and that ammonization of the mixture yields ammonium phosphate crystals of adequate size that can easily and quickly be separated from the solution. The product is almost white coloured because it includes only part of the impurities that remained in the purified phosphoric acid while the balance of impurities is contained in the water/solvent mixture. The quantity of residual impurities in the product depends on the degree of previous separation of impurities from the technical grade phosphoric acid.

It is another advantage of the process according to the present invention that the remaining water/solvent mixture need be heated only to expel the solvent that requires considerably less heat of vaporization than the processes of the prior art. This means a substantial reduction of heat requirements and, consequently, of the manufacturing costs. The water separated from the technical grade phosphoric acid and remaining in the bottom of the distillation column is discharged as waste effluent.

The following examples reflect the reduction of impurities.

EXAMPLE 1

| Quantity of phosphoric acid of the following composition: | | | | |
|---|---|---|---|---|
| | $P_2O_5$ | 29.0% | ≅ | 68.5 g / 19.87 g |
| | $F_{total}$ | 2.3% | ≅ | 1.575 g |
| | $SO_4$ | 4.1% | ≅ | 2.810 g |

After adding 350 cm³ ≅ 281.0 g of acetone, filtration yields 1.65 g of residue insoluble in acetone and containing 20.3 % $P_2O_5$ ≅ 0.32 g $P_2O_5$.

The acid/acetone filtrate mixture was subjected to ammonization with ammonia, the yield being 38.0 g of ammonium phosphate of the following composition:

| $P_2O_5$ | 51.0% | ≅ | 19.38 g |
|---|---|---|---|
| $F_{total}$ | 2.42% | ≅ | 0.92 g |
| $SO_4$ | 6.10% | ≅ | 2.32 g |
| N | 13.50% | | |

EXAMPLE 2

| Quantity of phosphoric acid of the following composition: | | | | |
|---|---|---|---|---|
| | $P_2O_5$ | 27.2% | ≅ | 66.0 g / 17.95 g |
| | $F_{total}$ | 2.24% | ≅ | 1.48 g |
| | $SO_4$ | 2.75% | ≅ | 1.82 g |
| | Fe | 0.91% | ≅ | 0.60 g |

After adding 300 cm³ ≅ 241 g of acetone, filtration yields 3.0 g of residue insoluble in acetone and containing 29.6 % $P_2O_5$.

The acid/acetone filtrate mixture was subjected to ammonization with ammonia, the yield being 32.4 g of ammonium phosphate of the following composition:

| | | | | |
|---|---|---|---|---|
| $P_2O_5$ | 52.4% | ≅ | 16.98 | g |
| F | 2.42% | ≅ | 0.78 | g |
| $SO_4$ | 4.56% | ≅ | 1.61 | g |
| Fe | 0.22% | ≅ | 0.06 | g |
| N | 12.74% | | | |

BRIEF DESCRIPTION OF THE DRAWING

The FIGURE is a very simplified typical flow scheme of the process according to the invention.

DESCRIPTION OF THE PREFERRED EMBODIMENT

Technical grade phosphoric acid and organic solvent are combined and thoroughly mixed to obtain a homogeneous mixture. In process step 1, impurities are precipitated from the phosphoric acid and separated from the solution by conventional methods. The sludge obtained is rejected. The effluent phosphoric acid/solvent mixture from process step 1 is subjected to ammonization with ammonia in process step 2. The time of ammonization is controlled to permit the formation of full size ammonium phosphate crystals. Process step 3 serves for separating the ammonium phosphate product by conventional methods and its further treatment to obtain a marketable product. The effluent water/solvent mixture from process step 3 is sent to the distillation step 4 where the organic solvent is expelled from the water. The recovered solvent is cooled, returned to the starting point of the process and added again to the technical grade phosphoric acid feedstock. The water originating from the technical grade phosphoric acid and collecting in the bottom of the distillation column is withdrawn as waste effluent. This water contains another portion of impurities from the phosphoric acid. The purity of the finished product depends on the technical refinement of equipment used for separation in the two process steps, i.e., in process step 1 for retaining the impurities by filtration and in process step 2 for retaining the ammonium phosphate crystals by filtration.

What we claim is:

1. A process for manufacturing ammonium phosphate comprising the steps of:
    I. forming a mixture of an aqueous technical grade phosphoric acid and acetone which forms a miscible mixture with water and phosphoric acid, wherein the miscible mixture is a non-solvent for ammonium phosphate, whereby any impurities in the technical grade phosphoric acid are precipitated,
    II. separating the precipitated impurities to form a purified mixture,
    III. contacting the purified mixture with ammonia to produce ammonium phosphate crystals and a supernatant liquid,
    IV. separating the ammonium phosphate crystals from the supernatant liquid,
    V. distilling the supernatant liquid of Step IV to separate the acetone and,
    VI. recycling the acetone produced in Step V to Step I.

* * * * *